(12) United States Patent
Prasse

(10) Patent No.: US 7,960,577 B2
(45) Date of Patent: Jun. 14, 2011

(54) PROCESS FOR PREPARING ORGANOSILICON COMPOUNDS HAVING ORGANYLOXY GROUPS

(75) Inventor: Marko Prasse, Glaubitz (DE)

(73) Assignee: Wacker Chemie AG, Munich (DE)

( * ) Notice: Subject to any disclaimer, the term of this patent is extended or adjusted under 35 U.S.C. 154(b) by 643 days.

(21) Appl. No.: 12/033,074

(22) Filed: Feb. 19, 2008

(65) Prior Publication Data

US 2008/0207938 A1 Aug. 28, 2008

(30) Foreign Application Priority Data

Feb. 26, 2007 (DE) .................. 10 2007 009 286

(51) Int. Cl.
*C07F 7/04* (2006.01)
*C07F 7/08* (2006.01)

(52) U.S. Cl. ........................ 556/467; 556/482

(58) Field of Classification Search .......... None
See application file for complete search history.

(56) References Cited

U.S. PATENT DOCUMENTS

| 3,504,051 | A | * | 3/1970 | McVannel ............ 528/33 |
|---|---|---|---|---|
| 4,515,932 | A | | 5/1985 | Chung et al. |
| 5,055,502 | A | | 10/1991 | Frances et al. |
| 6,951,912 | B2 | | 10/2005 | Scheim et al. |
| 2004/0266967 | A1 | | 12/2004 | Ziche |
| 2005/0215705 | A1 | | 9/2005 | Prasse et al. |
| 2005/0215747 | A1 | | 9/2005 | Scheim et al. |

FOREIGN PATENT DOCUMENTS

| DE | 101 21 514 A1 | | 11/2002 |
|---|---|---|---|
| DE | 101 58 520 A1 | | 6/2003 |
| DE | 10 2004 014 216 A | | 10/2005 |
| DE | 10 2004 014 217 A | | 10/2005 |
| EP | 0 304 701 A2 | | 3/1989 |
| FR | 2 604 713 | | 4/1988 |
| GB | 2 196 014 A | | 4/1988 |
| JP | 2007-224089 | * | 9/2007 |

OTHER PUBLICATIONS

Beckmann et al., {Tert-butoxysilanols as model compounds for labile key intermediates of the sol-gel process: crystal and molecular structures of (t-BuO)2SiOH and HO[(t-BuO)2SiO]2H, Applied Organometallic Chemistry (2003), 17(1), 52-62}.*

Torry et al., {Kinetic analysis of organosilane hydrolysis and condensation, International Journal of Adhesion and Adhesives (2006), 26(1-2), 40-49}.*

Kovyazin et al.{Transetherification of Organosilicon Amines with Cellosolve and Trimethylsilanol, Russian Journal of General Chemistry, vol. 73, No. 9, 2003, pp. 1383-1387. Translated from Zhurnal Obshchei Khimii, vol. 73, No. 9, 2003, pp. 1462-1467}.*

* cited by examiner

*Primary Examiner* — Brian J Davis
(74) *Attorney, Agent, or Firm* — Brooks Kushman P.C.

(57) ABSTRACT

Organosilicon compounds having organyloxy groups are prepared by reacting an organosilicon compound (A) having at least one silanol group with a compound (B) containing at least two organyloxy groups in the presence of a component (C) comprising a zinc chelate (C1) and at least one additive (C2) selected from the group consisting of compounds containing basic nitrogen (C21) and alcohols (C22). The products are useful in compositions which crosslink at room temperature.

9 Claims, No Drawings

PROCESS FOR PREPARING ORGANOSILICON COMPOUNDS HAVING ORGANYLOXY GROUPS

BACKGROUND OF THE INVENTION

1. Field of the Invention

The present invention relates to a process for preparing organosilicon compounds having organyloxy groups in the presence of a catalyst system comprising a zinc chelate and an amine and/or alcohol, and also to their use in compositions which crosslink at room temperature.

2. Background Art

The preparation of siloxane compounds from silanol and alkoxysilanes in the presence of titanates, optionally with amines, has been known for a long time. Reference may be had, for example, to U.S. Pat. No. 3,504,051. To prepare alkoxy-terminated polydimethylsiloxanes, the combination of various acids with amines has also been described, e.g. organic acids with amines in FR 2,604,713, Lewis acids with amines in U.S. Pat. No. 4,515,932 or formic acid with amines in EP-A 304 701. U.S. Pat. No. 5,055,502 describes the use of zinc chelates as a catalyst for the preparation of alkoxy-terminated polydimethylsiloxanes. All these preparative methods have certain disadvantages: the reaction times are usually very long, thus requiring temperatures which are higher than the temperatures which are usually employed, or the required catalyst concentrations are so high that the catalysts have to be removed or deactivated in an additional step. Many systems tend to suffer from yellowing or are stable only in particular formulations.

SUMMARY OF THE INVENTION

The invention provides a process for preparing organosilicon compounds having organyloxy groups, which comprises reacting an organosilicon compound (A) having at least one silanol group with a compound (B) containing at least two organyloxy groups in the presence of a component (C) comprising a zinc chelate (C1) and at least one additive (C2) selected from the group consisting of compounds containing basic nitrogen (C21) and alcohols (C22).

DETAILED DESCRIPTION OF THE PREFERRED EMBODIMENT(S)

The organosilicon compound (A) having silanol groups is preferably a compound comprising units of the formula $$R_a(OH)_b SiO_{(4-a-b)/2} \quad (I)$$

where
the radicals R are identical or different SiC-bonded, substituted or unsubstituted hydrocarbon radicals,
a is 0, 1, 2 or 3, preferably 1 or 2, and
b is 0, 1 or 2, preferably 0 or 1,
with the proviso that $a+b \leq 4$ and at least one unit of the formula (I) in which b is not 0 is present per molecule.

The organosilicon compounds (A) can be either silanes, i.e. compounds of the formula (I) in which $a+b=4$, or siloxanes, i.e. compounds comprising units of the formula (I) in which $a+b \leq 3$. The organosilicon compounds are preferably organopolysiloxanes, in particular those consisting of units of the formula (I). For the purposes of the present invention, the term "organopolysiloxanes" encompasses polymeric, oligomeric and dimeric siloxanes.

Examples of R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical and the α- and β-phenylethyl radicals.

Examples of substituted radicals R are haloalkyl radicals such as the 3,3,3-trifluoro-n-propyl radical, the 2,2,2,2',2',2'-hexafluoroisopropyl radical, the heptafluoroisopropyl radical, haloaryl radicals such as the o-, m- and p-chlorophenyl radicals, and also gamma-functionalized propyl radicals such as the 3-aminopropyl radical, the 3-(2-aminoethyl)aminopropyl radical, the 3-glycidoxypropyl radical, the 3-mercaptopropyl radical, and the 3-methacryloxypropyl radical.

The radicals R are preferably hydrocarbon radicals which have from 1 to 18 carbon atoms and may be substituted by halogen atoms, amino groups, ether groups, ester groups, epoxy groups, mercapto groups, cyano groups, or (poly)glycol radicals, with the latter preferably comprising oxyethylene and/or oxypropylene units. The radicals R are most preferably hydrocarbon radicals having from 1 to 8 carbon atoms, in particular the methyl radical.

The organosilicon compounds (A) are preferably organosilicon compounds having at least two silanol groups, and are preferably essentially linear organopolysiloxanes. The polymers of the formula (I) preferably have a viscosity of from $10^2$ to $10^8$ mPa·s, more preferably from 1000 to 350,000 mPa·s, in each case at 25° C. Components (A) are commerically available products or can be prepared by methods customary in chemistry.

Examples of organosilicon compounds (A) used according to the invention are
$HO(Si(CH_3)_2O)_{29-1000}Si(CH_3)_2(CH_2)_3NH_2$,
$HO(Si(CH_3)_2O)_{29-1000}Si(CH_3)_2(OH)$,
$HO(Si(CH_3)_2O)_{2-1000}Si(CH_3)_3$,
$HO(Si(CH_3)_2O)_{0-100}Si(CH_3)_2(CH_2)_3O(CH_2CH(CH_3)O)_{10-1000}(CH_2)_3)_2O)_{0-100}Si—(CH_3)_2(OH)$,
$HO(Si(CH_3)_2O)_{3-500}Si(O)_3[(Si(CH_3)_2O)_{3-500}H]_3$ and
$HO(Si(CH_3)_2O)_{3-500}Si(CH_3)(O)_2[(Si(CH_3)_2O)_{3-500}H]_2$,
with $HO(Si(CH_3)_2O)_{30-1000}Si(CH_3)_2(CH_2)_3NH_2$,
$HO(Si(CH_3)_2O)_{30-1000}Si(CH_3)_2(OH)$,
$HO(Si(CH_3)_2O)_{30-1000}Si(CH_3)_3$ and
$HO(Si(CH_3)_2O)_{3-500}Si(CH_3)(O)_2[(Si(CH_3)_2O)_{3-500}H]_2$
being preferred, and $HO(Si(CH_3)_2O)_{3-1000}Si(CH_3)_2(OH)$ being particularly preferred.

The compound (B) having organyloxy groups is preferably a compound comprising units of the formula $$R^1_c(OR^2)_d(OH)_e SiO_{(4-c-d-e)/2} \quad (II),$$

where
the radicals $R^1$ can be identical or different and each have one of the meanings given for the radicals R,
the radicals $R^2$ can be identical or different and can each be a substituted or unsubstituted hydrocarbon radical which may be interrupted by oxygen atoms,
c is 0, 1, 2 or 3,
d is 0, 1, 2, 3 or 4 and
e is 0 or 1, preferably 0, with the proviso that the sum $c+d+e \leq 4$ and at least two radicals —$OR^2$ are present per molecule.

The compounds (B) can be either silanes, i.e. compounds of the formula (II) in which $c+d+e=4$, or siloxanes, i.e. compounds comprising units of the formula (II) in which $c+d+e \leq 3$. The compounds (B) used according to the invention are preferably silanes of the formula (II) in which d is then preferably 3 or 4. The compounds (B) are preferably organosilicon compounds having at least three organyloxy groups.

Examples of radicals $R^1$ are the examples given for radical R. The radicals $R^1$ are preferably methyl, ethyl, n-propyl, isopropyl, 1-n-butyl, 2-n-butyl, isobutyl, tert-butyl, phenyl or vinyl radicals, with methyl and vinyl radicals being particularly preferred.

Examples of radicals $R^2$ are the examples given for radical R. The radicals $R^2$ are preferably methyl, ethyl or isopropyl radicals, with the methyl radical being particularly preferred.

Examples of compounds (B) are methyltrimethoxysilane, dimethyldimethoxysilane, tetramethoxysilane, vinyltrimethoxysilane, methylvinyldimethoxysilane, methyltriethoxysilane, tetraethoxysilane, phenyltrimethoxysilane, n-butyltrimethoxysilane, isobutyltrimethoxysilane and tert-butyltrimethoxysilane and also their partial hydrolysates, with methyltrimethoxysilane, tetramethoxysilane, vinyltrimethoxysilane, methylvinyldimethoxysilane, methyltriethoxysilane, tetraethoxysilane and n-butyltrimethoxysilane being preferred, and methyltrimethoxysilane, tetramethoxysilane, vinyltrimethoxysilane, tetraethoxysilane and n-butyltrimethoxysilane being particularly preferred. Components (B) are commercially available products or can be prepared by methods customary in chemistry.

In the process of the invention, component (B) is preferably used in a 1- to 100-fold molar excess, more preferably in a 2- to 50-fold molar excess, in each case based on the molar amount of Si—OH groups in the compound (A).

In the process of the invention, component (C) is preferably used in amounts of from 5 to 10,000 ppm by weight, more preferably from 100 to 3000 ppm by weight, in each case based on the total amount of components (A) and (B).

The zinc chelate (C1) is preferably a compound of the formula (III)

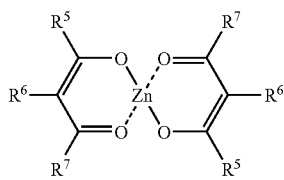

(III)

where $R^5$, $R^6$ and $R^7$ can be identical or different and are each, independently of one another, a hydrogen atom, a substituted or unsubstituted hydrocarbon radical or organyloxy radical.

Examples of hydrocarbon radicals $R^5$, $R^6$ and $R^7$ are, in each case independently of one another, the examples given for radical R and radical —$OR^2$. If $R^5$, $R^6$ and $R^7$ are substituted hydrocarbon radicals, preferred substituents are, in each case independently of one another, halogen atoms, amino groups, ether groups, ester groups, epoxy groups, mercapto groups, cyano groups or (poly)glycol radicals, with the latter preferably being made up of oxyethylene and/or oxypropylene units.

Preference is given to the radicals $R^5$ and $R^7$ each being, independently of one another, a hydrogen atom, a radical —$OR'$ where $R'$ is a substituted or unsubstituted hydrocarbon radical, e.g. a methoxy, ethoxy, isopropoxy, butoxy and phenoxy radical, or a substituted or unsubstituted hydrocarbon radical having from 1 to 18 carbon atoms, more preferably a methyl, ethyl, phenyl or trifluoromethyl radical, a $(CH_3)_3C$—, $Ph$-$CH_2$— or $(CH_3)_2CH$— radical, and in particular, a methyl radical, ethyl radical, a $(CH_3)_3C$— or $(CH_3)_2CH$— radical, where "Ph" is a phenyl radical.

The radical $R^6$ is preferably a hydrogen atom or a substituted or unsubstituted hydrocarbon radical having from 1 to 18 carbon atoms, more preferably a hydrogen atom or a methyl or ethyl radical, in particular a hydrogen atom.

Although not indicated in the formula (III), two of the radicals $R^5$, $R^6$ and $R^7$ can together also form a bifunctional, substituted or unsubstituted hydrocarbon radical having from 5 to 12 carbon atoms. $R^7$ and $R^5$ together can also form a ring, as in 1,3-cycloheptanedione or 1,3-cyclohexanedione. $R^6$ and $R^5$ can also together form a ring, as in salicylic esters, e.g. benzyl salicylate, phenyl salicylate, ethyl salicylate, 2-ethylhexyl salicylate, 2-hydroxybenzaldehyde or as in 2-acetylcyclopentanone, 2-acetylcyclohexanone or 2-acetyl-1,3-cyclohexanedione.

Examples of zinc chelates (C1) used according to the invention are zinc bis(hexafluoroacetylacetonate), zinc bis(1,3-diphenyl-1,3-propanedionate), zinc bis(l-phenyl-5-methyl-1,3-hexanedionate), zinc bis(1,3-cyclohexanedionate), zinc bis(2-acetylcyclohexanonate), zinc bis(2-acetyl-1,3-cyclohexanedionate), zinc bis(ethyl salicylate), zinc bis(diethyl malonate), zinc bis(ethyl acetoacetate), zinc bis(benzyl salicylate), zinc bis-acetylacetonate and zinc bis(2,2,6,6-tetramethyl-3,5-heptanedionate), with zinc bisacetylacetonate and zinc bis(2,2,6,6-tetramethyl-3,5-heptanedionate) being preferred. Components (C1) are commercially available products or can be prepared by methods customary in chemistry.

The component (C) preferably comprises zinc chelate (C1) in amounts of from 1 to 80% by weight, more preferably from 5 to 60% by weight, and in particular from 10 to 50% by weight.

The compounds (C21) having basic nitrogen which may be present in component (C) are preferably compounds selected from among compounds of the formula $$NR^8_3 \qquad (IV),$$

where the radicals $R^8$ can be identical or different and are each a hydrogen atom or a hydrocarbon radical optionally substituted by hydroxy groups, halogen atoms, amino groups, ether groups, ester groups, epoxy groups, mercapto groups, cyano groups or (poly)glycol radicals, with the latter preferably being made up of oxyethylene and/or oxypropylene units, with the proviso that not more than two radicals $R^8$ in the formula (IV) are hydrogen atoms; aliphatic cyclic amines, for example piperidine and morpholine; and organosilicon compounds which have at least one organic radical having basic nitrogen and comprise units of the formula $$R^9_k A_l Si(OR^{10})_m O_{(4-k-l-m)/2} \qquad (V),$$

where the radicals $R^9$ can be identical or different and are each a monovalent, substituted or unsubstituted SiC-bonded organic radical which is free of basic nitrogen, the radicals $R^{10}$ can be identical or different and are each a hydrogen atom or a substituted or unsubstituted hydrocarbon radical, the radicals A can be identical or different and are each a monovalent, Si-bonded radical having basic nitrogen, k is 0, 1, 2, or 3, l is 0, 1, 2, 3 or 4 and m is 0, 1, 2 or 3, with the proviso that the sum k+l+m is less than or equal to 4 and at least one radical A is present per molecule.

The organosilicon compounds (C21) can be either silanes, i.e. compounds of the formula (V) in which k+l+m=4, or siloxanes, i.e. compounds comprising units of the formula (V) in which k+l+m≦3. If the organosilicon compounds are organopolysiloxanes, preference is given to those consisting of units of the formula (V).

Examples of radicals $R^8$ and $R^9$ are, in each case independently of one another, the examples of substituted or unsubstituted hydrocarbon radicals given for R. The radicals $R^8$ are preferably hydrocarbon radicals having from 1 to 18 carbon atoms, with the ethyl, n-propyl, isopropyl, n-butyl, isobutyl, sec-butyl, 2-ethylhexyl, cyclohexyl, 1-methylheptyl and n-octyl radicals being more preferred, most preferably the n-butyl radical.

The radicals $R^9$ are preferably hydrocarbon radicals having from 1 to 18 carbon atoms, with the methyl, ethyl and n-propyl radicals being more preferred, most preferably the methyl radical.

Examples of substituted or unsubstituted hydrocarbon radicals $R^{10}$ are the examples given for the radical $R^2$. The radical $R^{10}$ is preferably a hydrogen atom or an unsubstituted or nitrogen- or oxygen-substituted hydrocarbon radical having from 1 to 18 carbon atoms, more preferably a hydrogen atom or a hydrocarbon radical having from 1 to 3 carbon atoms, and in particular a hydrogen atom or a methyl or ethyl radical.

Examples of radicals A are radicals of the formulae $H_2NCH_2-$, $H_2N(CH_2)_2-$, $H_2N(CH_2)_3-$, $H_2N(CH_2)_2NH(CH_2)_2-$, $H_2N(CH_2)_2NH(CH_2)_3-$, $H_2N(CH_2)_2NH(CH_2)_2NH(CH_2)_3-$, $H_3CNH(CH_2)_3-$, $C_2H_5NH(CH_2)_3-$, $H_3CNH(CH_2)_2-$, $C_2H_5NH(CH_2)_2-$, $H_2N(CH_2)_4-$, $H_2N(CH_2)_5-$, $H(NHCH_2CH_2)_3-$, $C_4H_9NH(CH_2)_2NH(CH_2)_2-$, cyclo-$C_6H_{11}NH(CH_2)_3-$, cyclo-$C_6H_{11}NH(CH_2)_2-$, $(CH_3)_2N(CH_2)_3-$, $(CH_3)_2N(CH_2)_2-$, $(C_2H_5)_2N(CH_2)_3-$, cyclo-$C_6H_{11}NH-$, $CH_3CH_2CH(CH_3)NH-$ and $(C_2H_5)_2N(CH_2)_2-$.

A is preferably a $H_2N(CH_2)_3-$, $H_2N(CH_2)_2NH(CH_2)_3-$, $H_3CNH(CH_2)_3-$, $C_2H_5NH(CH_2)_3-$, cyclo-$C_6H_{11}NH-$, $CH_3CH_2CH(CH_3)NH-$ or cyclo-$C_6H_{11}NH(CH_2)_3-$ radical, with $H_2N(CH_2)_2NH(CH_2)_3-$ and cyclo-$C_6H_{11}NH(CH_2)_3-$ radicals being particularly preferred.

If the organosilicon compounds comprising units of the formula (V) are silanes, k is preferably 0, 1 or 2, more preferably 0 or 1, l is preferably 1 or 2, more preferably 1, and m is preferably 1, 2 or 3, more preferably 2 or 3, with the proviso that the sum k+l+m is equal to 4.

Examples of silanes of the formula (V) which may be used according to the invention are $H_2N(CH_2)_3-Si(OCH_3)_3$, $H_2N(CH_2)_3-Si(OC_2H_5)_3$, $H_2N(CH_2)_3-Si(OCH_3)_2CH_3$, $H_2N(CH_2)_3-Si(OC_2H_5)_2CH_3$, $H_2N(CH_2)_2NH(CH_2)_3-Si(OCH_3)_3$, $H_2N(CH_2)_2NH(CH_2)_3-Si(OC_2H_5)_3$, $H_2N(CH_2)_2NH(CH_2)_3-Si(OCH_3)_2CH_3$, $H_2N(CH_2)_2NH(CH_2)_3-Si(OC_2H_5)_2CH_3$, $(CH_3)_3Si-NH-Si(CH_3)_3$, $H_2N(CH_2)_2NH(CH_2)_3-Si(OH)_3$, $H_2N(CH_2)_2NH(CH_2)_3-Si(OH)_2CH_3$, $H_2N(CH_2)_2NH(CH_2)_2NH(CH_2)_3-Si(OCH_3)_3$, $H_2N(CH_2)_2NH(CH_2)_3-Si(OC_2H_5)_3$, cyclo-$C_6H_{11}NH(CH_2)_3-Si(OCH_3)_3$, cyclo-$C_6H_{11}NH(CH_2)_3-Si(OC_2H_5)_3$, cyclo-$C_6H_{11}NH(CH_2)_3-Si(OCH_3)_2CH_3$, cyclo-$C_6H_{11}NH(CH_2)_3-Si(OC_2H_5)_2CH_3$, cyclo-$C_6H_{11}NH(CH_2)_3-Si(OH)_3$, cyclo-$C_6H_{11}NH(CH_2)_3-Si(OH)_2CH_3$, $(CH_3)_2Si(NHCH(CH_3)CH_2CH_3)_2$, (cyclo-$C_6H_{11}NH)_3Si-CH_3$, $(CH_3CH_2(CH_3)CHNH)_3Si-CH_3$, $HN((CH_2)_3-Si(OCH_3)_2)_2$ and $HN((CH_2)_3-Si(OC_2H_5)_3)_2$ and their partial hydrolysates, with $H_2N(CH_2)_2NH(CH_2)_3-Si(OCH_3)_3$, $H_2N(CH_2)_2NH(CH_2)_3-Si(OC_2H_5)_3$, $H_2N(CH_2)_2NH(CH_2)_3-Si(OCH_3)_2CH_3$, $H_2N(CH_2)_2NH(CH_2)_3-Si(OC_2H_4)_2CH_3$, $H_2N(CH_2)_2NH(CH_2)_3-Si(OH)_3$, $H_2N(CH_2)_2NH(CH_2)_3-Si(OH)_2CH_3$, cyclo-$C_6H_{11}NH(CH_2)_3-Si(OCH_3)_3$, cyclo-$C_6H_{11}NH(CH_2)_3-Si(OC_2H_5)_3$, cyclo-$C_6H_{11}NH(CH_2)_3-Si(OCH_3)_2CH_3$, cyclo-$C_6H_{11}NH(CH_2)_3-Si(OC_2H_5)_2CH_3$, cyclo-$C_6H_{11}NH(CH_2)_3-Si(OH)_3$ and cyclo-$C_6H_{11}NH(CH_2)_3-Si(OH)_2CH_3$ being preferred, and with $H_2N(CH_2)_2NH(CH_2)_3-Si(OCH_3)_3$, $H_2N(CH_2)_2NH(CH_2)_3-Si(OCH_3)_2CH_3$, cyclo-$C_6H_{11}NH(CH_2)_3-Si(OCH_3)_3$, cyclo-$C_6H_{11}NH(CH_2)_3-Si(OCH_3)_2CH_3$, $H_2N(CH_2)_2NH(CH_2)_3-Si(OH)_3$, and $H_2N(CH_2)_2NH(CH_2)_3-Si(OH)_2CH_3$ and their partial hydrolysates being particularly preferred.

If the organosilicon compounds comprising units of the formula (V) are organopolysiloxanes, the average value of k is preferably from 0.5 to 2.5, more preferably from 1.4 to 2.0, the average value of l is preferably from 0.01 to 1.0, more preferably from 0.01 to 0.6, and the average value of m is preferably from 0 to 2.0, more preferably from 0 to 0.2, with the proviso that the sum of k, l and m is less than or equal to 3.

Examples of the siloxanes comprising units of the formula (V) which may be used according to the invention are
$H_2N(CH_2)_3-Si(OCH_3)_2-O-Si(CH_3)(OCH_3)_2$,
$H_2N(CH_2)_3-Si(OC_2H_5)_2-O-Si(CH_3)(OCH_3)_2$,
$H_2N(CH_2)_3-Si(OC_2H_5)_2-O-Si(CH_3)(OC_2H_5)_2$,
$H_2N(CH_2)_3-Si(OCH_3)(CH_3)-O-Si(CH_3)(OCH_3)_2$,
$H_2N(CH_2)_3-Si(OCH_3)(CH_3)-O-Si(OCH_3)_3$,
$H_2N(CH_2)_3-Si(OC_2H_5)(CH_3)-O-Si(OCH_3)_3$,
$H_2N(CH_2)_2NH(CH_2)_3-Si(OCH_3)_2-O-Si(CH_3)(OCH_3)_2$,
$H_2N(CH_2)_2NH(CH_2)_3-Si(OC_2H_5)_2-O-Si(CH_3)(OCH_3)_2$,
$H_2N(CH_2)_2NH(CH_2)_3-Si(OC_2H_5)_2-O-Si(CH_3)(OC_2H_5)_2$,
$H_2N(CH_2)_2NH(CH_2)_3-Si(OCH_3)(CH_3)-O-Si(CH_3)(OCH_3)_2$,
$H_2N(CH_2)_2NH(CH_2)_3-Si(OCH_3)(CH_3)-O-Si(OCH_3)_3$,
$H_2N(CH_2)_2NH(CH_2)_3-Si(OC_2H_5)(CH_3)-O-Si(OCH_3)_3$,
cyclo-$C_6H_{11}NH(CH_2)_3-Si(OCH_3)_2-O-Si(CH_3)(OCH_3)_2$,
cyclo-$C_6H_{11}NH(CH_2)_3-Si(OC_2H_5)_2-O-Si(CH_3)(OCH_3)_2$,
cyclo-$C_6H_{11}NH(CH_2)_3-Si(OC_2H_5)_2-O-Si(CH_3)(OC_2H_5)_2$,
cyclo-$C_6H_{11}NH(CH_2)_3-Si(OCH_3)(CH_3)-O-Si(CH_3)(OCH_3)_2$,
cyclo-$C_6H_{11}NH(CH_2)_3-Si(OCH_3)(CH_3)-O-Si(OCH_3)_3$,
cyclo-$C_6H_{11}NH(CH_2)_3-Si(OC_2H_5)(CH_3)-O-Si(OCH_3)_3$,
$H_2N(CH_2)_3-Si(OCH_3)_2-(O-Si(CH_3)_2)_{0-100}-(O-Si(CH_3)-(CH_2)_3-NH_2)_{0-100}-O-Si(OCH_3)_2-(CH_2)_3NH_2$,
$H_2N(CH_2)_2NH(CH_2)_3-Si(OCH_3)_2-(O-Si(CH_3)_2)_{0-100}-(O-Si(CH_3)-(CH_2)_3-NH(CH_2)_2NH_2)_{0-100}-O-Si(OCH_3)_2-(CH_2)_3NH(CH_2)_2NH_2$,
$H_2N(CH_2)_3-Si(OCH_2CH_3)_2-(O-Si(OCH_2CH_3)_2)_{1-100}-(O-Si(OCH_2CH_3(CH_2)_3NH_2)_{0-100}-O-Si(OCH_2CH_3)_2-(CH_2)_3NH_2$,
$Si(OCH_2CH_3)_3-(O-Si(OCH_2CH_3)_2)_{0-100}-(O-Si(OCH_2CH_3)(CH_2)_3NH_2)_{1-100}-O-Si(OCH_2CH_3)_3$ and
cyclo-$C_6H_{11}NH(CH_2)_3-Si(OCH_3)_2-(O-Si(CH_3)_2)_{0-100}-(O-Si(CH_3)-(CH_2)_3-NH$-cyclo-$C_6H_{11})_{0-100}-O-Si(OCH_3)_2-(CH_2)_3-NH$-cyclo-$C_6H_{11}$.

Component (C21) is preferably $H_2N(CH_2)_3-Si(OCH_3)_3$, $H_2N(CH_2)_3-Si(OC_2H_5)_3$, $H_2N(CH_2)_3-Si(OCH_3)_2CH_3$, $H_2N(CH_2)$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $(CH_3)_2Si(NHCH(CH_3)CH_2CH_3)_2$, $H_2N(CH_2)_3$—$Si(OCH_3)_2$—$(O$—$Si(CH_3)_2)_{0-100}$—$(O$—$Si(CH_3)$—$(CH_2)_3NH_2)_{0-100}$—$O$—$Si(OCH_3)_2$—$(CH_2)_3NH_2$, $H_2N(CH_2)_2NH(CH_2)_3$—$Si(OCH_3)_2$—$(O$—$Si(CH_3)_2)_{0-100}$—$(O$—$Si(CH_3)$—$(CH_2)_3NH(CH_2)_2NH_2)_{0-100}$—$O$—$Si(OCH_3)_2$—$(CH_2)_3NH(CH_2)_2NH_2$, $H_2N(CH_2)_3$—$Si(OCH_2CH_3)_2$—$(O$—$Si(OCH_2CH_3)_2)_{1-100}$—$(O$—$Si(OCH_2CH_3)(CH_2)_3NH_2)_{0-100}$—$O$—$Si(OCH_2CH_3)_2$—$(CH_2)_3NH_2$, $Si(OCH_2CH_3)_3$—$(O$—$Si(OCH_2CH_3)_2)_{0-100}$—$(O$—$Si(OCH_2CH_3)(CH_2)_3NH_2)_{1-100}$—$O$—$Si(OCH_2CH_3)_3$, (cyclo-$C_6H_{11}NH)_3Si$—$CH_3$, $(CH_3CH_2(CH_3)CHNH)_3Si$—$CH_3$, $CH_3CH_2(CH_3)CHNH_2$, cyclo-$C_6H_{11}NH_2$, $(CH_3CH_2)_2N(CH_2)_3NH_2$, $(CH_3(CH_2)_3)_2N(CH_2)_3NH_2$, $CH_3CH_2CH_2CH_2NH_2$, $CH_3(CH_2)_7NH_2$, $(CH_3)_2CH(CH_2)_5NH_2$, $(CH_3CH_2(CH_3)CH)_2NH$, (cyclo-$C_6H_{11})_2NH$, $(CH_3CH_2CH_2CH_2)_2NH$, $(CH_3(CH_2)_7)_2NH$, $((CH_3)_2CH(CH_2)_5)_2NH$, $(CH_3CH_2CH_2CH_2)_3N$, $(CH_3(CH_2)_7)_3N$ or $((CH_3)_2CH(CH_2)_5)_3N$, with $(CH_3CH_2CH_2CH_2)_2NH$ being particularly preferred. Components (C21) are commercially available products or can be prepared by methods customary in chemistry.

The alcohols (C22) which may be present in the component (C) are preferably monohydric alcohols, and are preferably alcohols of the formula

$$R^{11}OH \qquad (VI),$$

where the radicals $R^{11}$ can be identical or different and are each a hydrocarbon radical having from 1 to 18 carbon atoms. The radicals $R^{11}$ are preferably hydrocarbon radicals having from 1 to 6 carbon atoms, more preferably methyl, ethyl, isopropyl and n-propyl radicals, and in particular the methyl radical. Examples of alcohols (C22) are methanol, ethanol, isopropanol and n-propanol, with methanol and ethanol being preferred and methanol being particularly preferred. Components (C22) are commercially available products or can be prepared by methods customary in chemistry.

The additive (C2) used in the process of the invention can be only the amine (C21) or only alcohol (C22) or a mixture of amines and alcohols. The additive (C2) used in the process of the invention is preferably an amine (C21). When the component (C) comprises an additive (C21), it is preferably present in amounts of from 3 to 2000 ppm by weight, more preferably from 20 to 1000 ppm by weight, based on the total amount of components (A) and (B). When the component (C) comprises an additive (C22), it is preferably present in amounts of from 100 to 6000 ppm by weight, more preferably from 500 to 3000 ppm by weight, based on the total amount of components (A) and (B).

In the process of the invention, the individual components can be mixed with one another in any order and in any way. It is also possible to prepare premixes of individual components, for example a mixture of the components (B) and (C) which is then mixed with the other components. Individual constituents can also be present right at the beginning or can be added during the mixing process. Thus, for example, part of the component (B) or component (C) can be added 1-60 minutes after mixing of the other constituents. The components used in the process of the invention can in each case be one type of such a component or a mixture of at least two types of a respective component.

The process of the invention is preferably carried out without additional heating at ambient temperatures or the temperatures which are established on mixing of the individual components. Preference is given to temperatures of from 10 to 60° C., more preferably from 15 to 40° C. The process of the invention is preferably carried out at the pressure of the surrounding atmosphere, i.e. from 900 to 1100 hPa. However, it can also be carried out at superatmospheric pressure, e.g. at absolute pressures in the range from 1100 to 3000 hPa, in particular in a continuous fashion with these pressures being, for example, generated in closed systems by pump pressure and/or by means of the vapor pressure of the materials at elevated temperatures.

The process of the invention is preferably carried out with exclusion of moisture, e.g. in dried air or nitrogen, and can, if desired, be carried out under protective gas such as nitrogen.

In the process of the invention, the reaction mixture can be devolatilized after the reaction is complete, with devolatilization being carried out by means of reduced pressure in the same apparatus, or in a downstream apparatus, with or without introduction of inert gas, at room temperature or at elevated temperatures. The volatile constituents are preferably alcohols such as methanol or ethanol. The process of the invention can be carried out continuously or batchwise.

In a preferred embodiment, polymer (A) is mixed continuously by means of a dynamic mixer with a mixture of silane (B), the zinc chelate (C1) and the alcohol (C22) and pumped into a storage silo or a residence section. An absolute pressure of about 1.5 bar preferably prevails in the reaction zone. An after-treatment, e.g. deactivation or devolatilization, preferably does not take place. The temperature depends essentially on the starting temperature of the polymer (A) and is in the range from 20 to 60° C. However, it is also possible for the mixture of (B) and (C) to be added immediately after the preparation of component (A), in which case the temperatures are preferably in a range from 80 to 120° C., although the mixture preferably is subsequently cooled to temperatures below 60° C.

Another preferred embodiment of the process comprises mixing polymer (A) with silicone plasticizers and a mixture of silane (B), zinc chelate (C1) and amine (C21) in a stirred vessel by means of a high-speed stirrer under nitrogen, preferably with transfer of the reaction mixture into a storage tank.

A further preferred embodiment comprises mixing polymer (A) with a mixture of silane (B), zinc chelate (C1) and amine (C21) in a stirred vessel by means of a high-speed stirrer under nitrogen, subsequent devolatilization of the reaction mixture at an absolute pressure of from 10 to 50 mbar, preferably followed by transfer into a storage tank.

Many organosilicon compounds having organyloxy groups can be prepared by the process of the invention. It is possible to use both pure silanes and mixtures of silanes.

Examples of organosilicon compounds having organyloxy groups which are prepared according to the invention are
$(MeO)_2(Me)SiO(Si(CH_3)_2O)_{3-1000}Si(CH_3)_2(CH_2)_3NH_2$,
$(MeO)_2(Me)SiO(Si(CH_3)_2O)_{30-1000}Si(CH_3)_2OSi(Me)(OMe)_2$,
$(MeO)_2(Me)SiO(Si(CH_3)_2O)_{30-1000}Si(CH_3)_2OSi(Me)_2(OMe)$,
$(MeO)_2(Vi)SiO(Si(CH_3)_2O)_{3-1000}Si(CH_3)_2OSi(Me)(OMe)_2$,
$(EtO)_2(Vi)SiO(Si(CH_3)_2O)_{30-1000}Si(CH_3)_2OSi(Me)(OMe)_2$,
$(MeO)_2(Me)SiO(Si(CH_3)_2O)_{30-1000}Si(CH_3)_2OSi(OMe)_3$,
$(EtO)_3SiO(Si(CH_3)_2O)_{30-1000}Si(CH_3)_2OSi(OEt)_3$,
$(MeO)_2(Me)SiO(Si(CH_3)_2O)_{30-1000}Si(CH_3)_3$,
$(MeO)_2(Me)SiO(Si(CH_3)_2O)_{1-100}Si(CH_3)_2(CH_2)_3O(CH_2CH(CH_3)O)_{10-1000}(CH_2)_3(Si(H_3)_2O)_{1-100}Si(CH_3)_2(OSi(Me)(OMe)_2)$,
$(MeO)_2(Me)SiO(Si(CH_3)_2O)_{3-500}Si(O)_3[(Si(CH_3)_2O)_{3-500}Si(Me)(OMe)_2]_3$ and

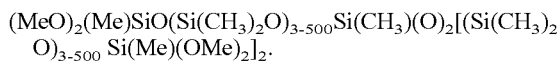

The organosilicon compounds prepared according to the invention are preferably compounds having from 10 to 10,000, particularly preferably from 100 to 2000 silicon atoms. The organosilicon compounds having organyloxy groups which are prepared according to the invention can be used for all purposes for which organosilicon compounds having organyloxy groups are useful. They are particularly suitable for producing compositions which can be crosslinked by a condensation reaction.

The constituents (E) which are usually used in addition to the organosilicon compounds having organyloxy groups prepared for producing compositions which can be crosslinked by a condensation reaction are constituents selected from the group consisting of crosslinkers, which can be the same compounds as described for component (B), condensation catalysts, bonding agents, fillers, plasticizers, stabilizers, dyes, fungicides and rheological additives. The constituents (E) have been widely described in the literature. On this subject, reference may be made, for example, to DE-A 102004014217, equivalent to U.S. published application 2005/215747 A1; DE-A 102004014216, equivalent to U.S. published application 2005/215705 A1; DE 10121514, equivalent to U.S. Pat. No. 6,951,912 B2; and DE 10158520, equivalent to AU 2002349005 A1, all of which are herein incorporated by reference into the disclosure of the present invention.

The constituents (E) can be added immediately after stirring together the constituents (A), (B) and (C) in the process of the invention, so that the crosslinkable compositions comprising the organosilicon compounds having organyloxy groups which were prepared as a base polymer, can be produced in one reaction vessel. However, the constituents (E) can also be added to the organosilicon compounds having organyloxy groups after temporary storage for from a few minutes to some months.

In a further preferred variant of the process of the invention, polymer (A) is mixed with silicone plasticizer and a mixture of silane (B), zinc chelate (C1) and amine (C21) by stirring in a paste mixer having a propeller stirrer and scraper under dried air. After from 10 to 30 minutes, further customary constituents for producing compositions which can be crosslinked by a condensation reaction, e.g. condensation catalysts, bonding agents, fillers, plasticizers, stabilizers, dyes, fungicides and rheological additives, are added and distributed homogeneously in the composition. Inert constituents such as dyes, fungicides and rheological additives can be initially charged before the polymer (A) in order to achieve better distribution.

The process of the invention has the advantage that organosilicon compounds having organyloxy groups can be prepared in a simple way, and the further advantage that even small amounts of component (C) make it possible for organyloxy-terminated organosilicon compounds used for the production of curable compositions to be prepared quickly without additional heating.

The process of the invention has the additional advantage that the organosilicon compounds having organyloxy groups do not display turbidity even after optional storage, and can thus be used optimally for the production of transparent curable compositions.

The process has the yet further advantage that the organosilicon compounds having organyloxy groups can be used for producing crosslinkable compositions immediately after their preparation, without prior isolation or after-treatment such as neutralization, filtration or deactivation by means of high temperatures. A still further advantage is that viscosity undergoes virtually no further change after mixing (mix viscosity) and no additional problems, e.g. as a result of stepwise or gradual viscosity increases, therefore occur in further processing.

In the following examples, all parts and percentages are, unless indicated otherwise, by weight. Unless indicated otherwise, the following examples are carried out at the pressure of the surrounding atmosphere, i.e. at about 1000 hPa, and at room temperature, i.e. about 20° C., or a temperature which is established on combining the reactants at room temperature without additional heating or cooling. All viscosity figures reported in the examples are based on a temperature of 25° C.

The analysis of the alkoxy-terminated polydimethylsiloxanes for substantial absence of silanol groups (Si—OH content less than 30 ppm by weight) is carried out by means of the quick titanate test: The polymer (e.g. a polymer which contained 2.5 mg of Si bonded OH groups before the reaction) and isopropyl titanate (e.g. 0.1 g) are mixed by stirring with a spatula for 3 minutes. When a sample drawn upward in a thin thread runs downward, the sample is largely silanol-free. If the sample drawn upward breaks, the polymer sample still contains more than 30 ppm by weight of Si-bonded OH groups.

Example 1

750 g of an α,ω-dihydroxypolydimethylsiloxane having a viscosity of 75,000 mPa·s, 135 g of a trimethylsilyl-endblocked polydimethylsiloxane having a viscosity of 1000 mPa·s, 10.3 g of methyltrimethoxysilane, 5.2 g of vinyltrimethoxysilane, 0.16 g of zinc acetylacetonate hydrate (commercially available from Sigma-Aldrich Co., Germany) and 0.32 g of dibutylamine (commercially available from Sigma-Aldrich Co., Germany) were stirred at 250 rpm in a planetary mixer with exclusion of moisture for 10 minutes. After 60 minutes, no silanol groups could be detected.

Example 2

The procedure described in Example 1 is repeated using 750 g of an α,ω-dihydroxypolydimethylsiloxane having a viscosity of 20,000 mPa·s in place of 750 g of the α,ω-dihydroxypolydimethylsiloxane having a viscosity of 75,000 mPa·s. After 120 minutes, no silanol groups could be detected.

Example 3

The procedure described in Example 1 is repeated with the mixture being stirred at 500 rpm rather than at 250 rpm. The temperature rose to 35° C. After 40 minutes, no silanol groups could be detected.

Example 4

The procedure described in Example 1 is repeated using 0.64 g of [3-(2-aminoethylamino)propyl]trimethoxysilane (commercially available from Sigma-Aldrich Co., Germany) in place of 0.32 g of dibutylamine. After 60 minutes, no silanol groups could be detected.

Example 5

The procedure described in Example 1 is repeated with the trimethylsilyl-endblocked polydimethylsiloxane being replaced by the same amount of a hydrocarbon mixture having a boiling range from 305 to 325° C., a paraffinic hydrocarbon content of 64%, a naphthenic hydrocarbon content of 36% and an aromatic hydrocarbon content of less than 0.1%, measured in accordance with DIN51378. After 120 minutes, no silanol groups could be detected.

Example 6

The procedure described in Example 1 is repeated using 24.0 g of tetraethyl orthosilicate (commercially available from Sigma-Aldrich Co., Germany) in place of 10.3 g of methyltrimethoxysilane and 5.2 g of vinyltrimethoxysilane. After 72 hours, no silanol groups could be detected.

Example 7

The procedure described in Example 1 is repeated using 1.44 g of methanol (commercially available from Sigma-Aldrich Co., Germany) in place of 0.32 g of dibutylamine. After 24 hours, no silanol groups could be detected.

Example 8

The procedure described in Example 1 is repeated with the 0.16 g of zinc acetylacetonate hydrate being replaced by the same amount of zinc hexafluoroacetylacetonate dihydrate, 98% (commercially available from Sigma-Aldrich Co., Germany). After 120 minutes, no silanol groups could be detected.

Example 9

The procedure described in Example 1 is repeated with the 0.16 g of zinc acetylacetonate hydrate being replaced by the same amount of zinc bis(2,2,6,6-tetramethyl-3,5-heptanedionate, 97% (commercially available from Sigma-Aldrich Co., Germany). After 30 minutes, no silanol groups could be detected.

Comparative Example 1

The procedure described in Example 1 is repeated without using any dibutylamine. Freedom from silanol groups was determined after 48 hours.

Comparative Example 2

The procedure described in Example 1 is repeated with the 0.16 g of zinc acetylacetonate hydrate being replaced by the same amount of aluminum acetylacetonate (commercially available from Sigma-Aldrich Co., Germany). After 72 hours, silanol groups could still be detected.

Comparative Example 3

The procedure described in Example 1 is repeated with the 0.16 g of zinc acetylacetonate hydrate being replaced by the same amount of zirconium(IV) acetylacetonate, 98% (commercially available from Sigma-Aldrich Co., Germany). After 72 hours, silanol groups could still be detected.

Comparative Example 4

The procedure described in Example 1 is repeated with the 0.16 g of zinc acetylacetonate hydrate being replaced by the same amount of zinc octoate (commercially available from Acima, Switzerland, under the trade name METATIN™ Catalyst Zn-18). After 72 hours, silanol groups could still be detected.

Example 10

408 g of an α,ω-dihydroxypolydimethylsiloxane having a viscosity of 75,000 mPa·s, 185 g of a trimethylsilyl-end-blocked polydimethylsiloxane having a viscosity of 1000 mPa·s, 11.2 g of methyltrimethoxysilane, 11.2 g of vinyltrimethoxysilane, 0.09 g of zinc acetylacetonate hydrate (commercially available from Merck, Germany) and 0.35 g of dibutylamine (commercially available from Merck, Germany) were stirred at 250 rpm in a planetary mixer with exclusion of moisture for 15 minutes. 12.5 g of a bonding agent prepared by a reaction of 1 part of aminopropyltriethoxysilane with 1 part of methyltriethoxysilane hydrolysate having an ethoxy content of 37%, 1.1 g of octylphosphonic acid and 4.5 g of aminopropyltrimethoxysilane were added thereto and the mixture was stirred for 5 minutes. The mixture is subsequently completed by homogeneously mixing in 63 g of pyrogenic silica having a specific surface area of 150 m$^2$/g (commercially available under the trade name HDK® V15 from Wacker Chemie AG), 1.4 g of a polyethylene glycol-polypropylene glycol copolymer having a viscosity of 700 mPa·s and 2.5 g of a tin catalyst prepared by a reaction of di-n-butyltin diacetate and tetraethoxysilane. Finally, the mixture is stirred for 5 minutes at an absolute pressure of about 100 mbar and dispensed and stored with exclusion of air.

The composition obtained in this way was applied in a thickness of 2 mm to a PE film and stored at 23° C./50% relative atmospheric humidity. After curing for 7 days, the modulus at 100% elongation was found to be 0.40 MPa.

In addition, part of the composition was introduced into an aluminum tube and stored at 50° C. After the preliminary storage indicated in Table 1, a sample of the composition was in each case applied in a thickness of 2 mm to a PE film and stored at 23° C./50% relative atmospheric humidity. Under these conditions, the skin formation time and the stickiness after storage for 24 hours were assessed. The results are shown in Table 1.

TABLE 1

| Preliminary storage | Skin formation time [min] | Stickiness |
|---|---|---|
| 1 day after production | 10 | tack-free |
| 3 weeks at 50° C. | 15 | tack-free |
| 6 weeks at 50° C. | 10 | tack-free |

Comparative Example 5

The procedure described in Example 10 is repeated without using any dibutylamine. The composition became solid during final mixing at an absolute pressure of about 100 mbar and could no longer be processed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing storage stable organosilicon compounds having organyloxy groups, comprising reacting an organosilicon compound (A) having at least one silanol group, comprising units of the formula $$R_a(OH)_b SiO_{(4-a-b)/2} \quad (I),$$

where
the radicals R are identical or different SiC-bonded, substituted or unsubstituted hydrocarbon radicals,
a is 0, 1, 2 or 3, and
b is 0, 1 or 2,
with the proviso that a+b≦4 and at least one unit of the formula (I) in which b is not 0 is present per molecule with a compound (B) containing at least two organyloxy groups, comprising units of the formula $$R^1_c(OR^2)_d(OH)_e SiO_{(4-c-d-e)/2} \quad (II),$$

where
the radicals $R^1$ can be identical or different and each have one of the meanings given for the radicals R,
the radicals $R^2$ can be identical or different and can each be a substituted or unsubstituted hydrocarbon radical optionally interrupted by oxygen atoms,
c is 0, 1, 2 or 3,
d is 0, 1, 2, 3 or 4 and
e is 0 or 1,
with the proviso that the sum c+d+e≦4 and at least two radicals —$OR^2$ are present per molecule in the presence of a component (C) comprising a zinc chelate (C1) and at least one additive (C2) selected from the group consisting of compounds containing basic nitrogen (C21) and alcohols (C22).

2. The process of claim 1, wherein the compound (B) having organyloxy groups is a compound comprising units of the formula $$R^1_c(OR^2)_d(OH)_e SiO_{(4-c-d-e)/2} \quad (II),$$

where
the radicals $R^1$ can be identical or different and each have one of the meanings given for the radicals R,
the radicals $R^2$ can be identical or different and can each be a substituted or unsubstituted hydrocarbon radical optionally interrupted by oxygen atoms,
c is 0, 1, 2 or 3,
d is 0, 1, 2, 3 or 4 and
e is 0 or 1,
with the proviso that the sum c+d+e<4 and at least two radicals —$OR^2$ are present per molecule.

3. The process of claim 1, wherein component (C) is used in amounts of from 5 to 10,000 ppm by weight, based on the total amount of components (A) and (B).

4. The process of claim 2, wherein component (C) is used in amounts of from 5 to 10,000 ppm by weight, based on the total amount of components (A) and (B).

5. The process of claim 1, wherein component (C) contains zinc chelate (C1) in an amount of from 1 to 80% by weight based on the total weight of component (C).

6. The process of claim 2, wherein component (C) contains zinc chelate (C1) in an amount of from 1 to 80% by weight based on the total weight of component (C).

7. The process of claim 3, wherein component (C) contains zinc chelate (C1) in an amount of from 1 to 80% by weight based on the total weight of component (C).

8. The process of claim 1, wherein components (C1) and (C2) of component (C) are added to other components as a premix.

9. The process of claim 1, wherein components (C1) and (C2) of component (C) are added separately to other components.

* * * * *